United States Patent
Pokhil et al.

(10) Patent No.: US 6,762,915 B2
(45) Date of Patent: Jul. 13, 2004

(54) MAGNETORESISTIVE SENSOR WITH OVERSIZED PINNED LAYER

(75) Inventors: Taras Grigoryevich Pokhil, Arden Hills, MN (US); Olle Gunnar Heinonen, Eden Prairie, MN (US); Chunhong Hou, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 98 days.

(21) Appl. No.: 10/056,729

(22) Filed: Jan. 25, 2002

(65) Prior Publication Data

US 2003/0043503 A1 Mar. 6, 2003

Related U.S. Application Data

(60) Provisional application No. 60/317,321, filed on Sep. 5, 2001.

(51) Int. Cl.[7] .................................................. G11B 5/39
(52) U.S. Cl. ................ 360/324.11; 360/324; 360/324.1
(58) Field of Search ........................ 360/324.11, 324.12, 360/324.2, 324, 324.1

(56) References Cited

U.S. PATENT DOCUMENTS

| | | | | |
|---|---|---|---|---|
| 5,650,958 A | * | 7/1997 | Gallagher et al. | 365/173 |
| 6,122,151 A | * | 9/2000 | Saito et al. | 360/324.12 |
| 6,466,419 B1 | * | 10/2002 | Mao | 360/324.12 |
| 2003/0039080 A1 | * | 2/2003 | Kagami et al. | 360/324.1 |
| 2003/0086216 A1 | * | 5/2003 | Kagami et al. | 360/324.2 |

FOREIGN PATENT DOCUMENTS

| | | | | |
|---|---|---|---|---|
| JP | 10091920 A | * | 4/1998 | G11B/5/39 |
| JP | 10190090 A | * | 7/1998 | H01L/43/00 |
| JP | 11175925 A | * | 7/1999 | G11B/5/39 |

* cited by examiner

Primary Examiner—William Klimowicz
(74) Attorney, Agent, or Firm—Kinney & Lange, P.A.

(57) ABSTRACT

A magnetoresistive stack for use in a magnetic read head has a plurality of layers including a ferromagnetic free layer, a ferromagnetic pinned layer, and an antiferromagnetic pinning layer. The pinned layer and pinning layer each have a greater number of structural grains than the free layer, which decreases a fluctuation of magnetization in the magnetoresistive stack without decreasing a spatial resolution of the magnetoresistive stack.

14 Claims, 4 Drawing Sheets

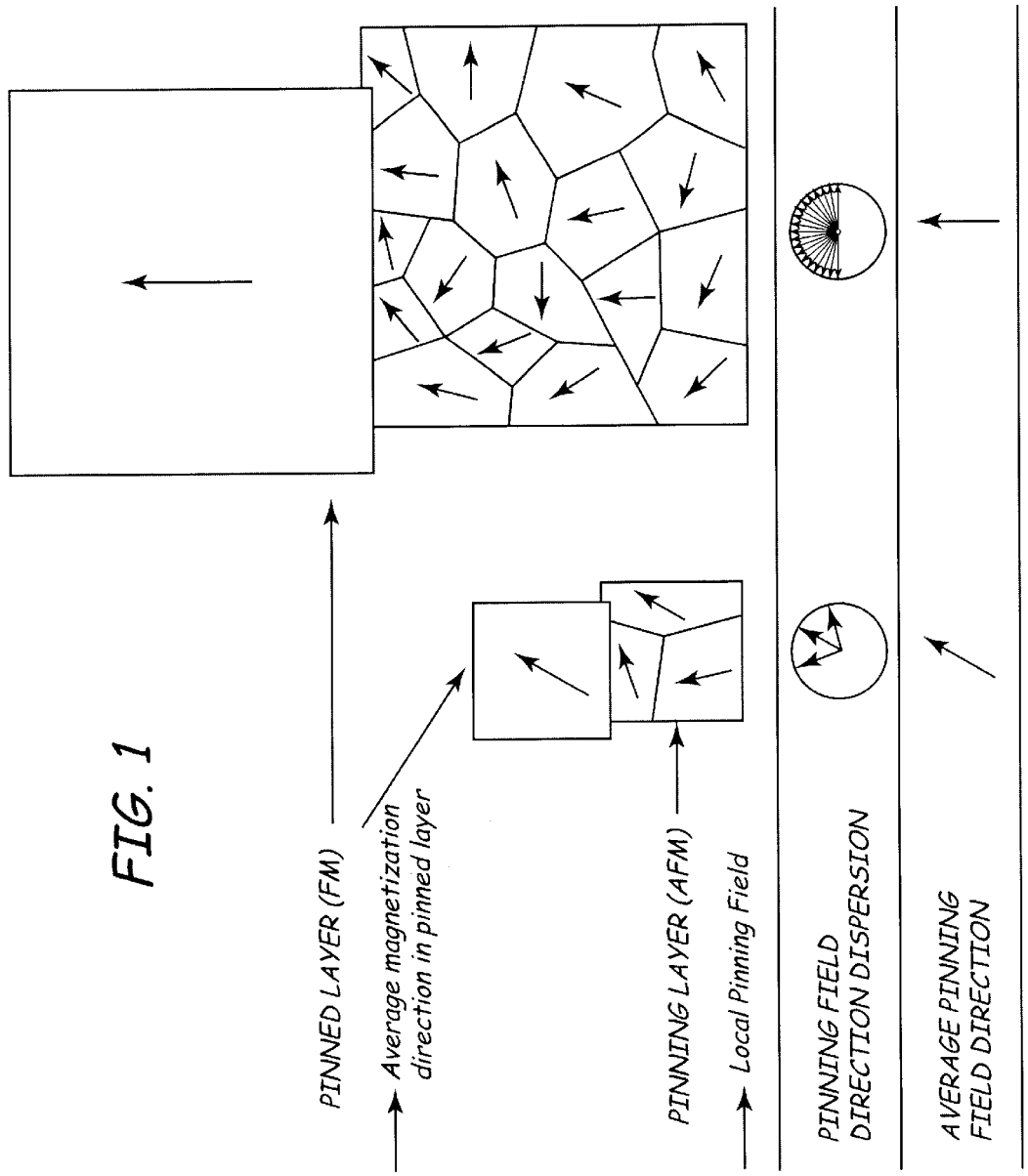

MAGNETORESISTIVE SENSOR WITH OVERSIZED PINNED LAYER

CROSS-REFERENCE TO RELATED APPLICATION(S)

This application claims priority from Provisional Application No. 60/317,321, filed Sep. 5, 2001 entitled "Magnetic Field Sensor with Large Pinned Layer" by T. Pokhil, O. Heinonen, and C. Hou.

BACKGROUND OF THE INVENTION

The present invention relates generally to a magnetoresistive sensor for use in a magnetic read head. In particular, the present invention relates to a magnetoresistive read sensor having enhanced pinned layer magnetization and stability.

Magnetoresistive read sensors, such as giant magnetoresistive (GMR) read sensors, are used in magnetic data storage systems to detect magnetically-encoded information stored on a magnetic data storage medium such as a magnetic disc. A time-dependent magnetic field from a magnetic medium directly modulates the resistivity of the GMR read sensor. A change in resistance of the GMR read sensor can be detected by passing a sense current through the GMR read sensor and measuring the voltage across the GMR read sensor. The resulting signal can be used to recover the encoded information from the magnetic medium.

A typical GMR read sensor configuration is the GMR spin valve, in which the GMR read sensor is a multi-layered structure formed of a nonmagnetic spacer layer positioned between a ferromagnetic pinned layer and a ferromagnetic free layer. The magnetization of the pinned layer is fixed in a predetermined direction, typically normal to an air bearing surface of the GMR read sensor, while the magnetization of the free layer rotates freely in response to an external magnetic field. The resistance of the GMR read sensor varies as a function of an angle formed between the magnetization direction of the free layer and the magnetization direction of the pinned layer. This multi-layered spin valve configuration allows for a more pronounced magnetoresistive effect, i.e. greater sensitivity and higher total change in resistance, than is possible with anisotropic magnetoresistive (AMR) read sensors, which generally consist of a single ferromagnetic layer.

The pinned layer can be a single ferromagnetic layer or a multilayer synthetic antiferromagnet (SAF). An SAF includes a ferromagnetic reference layer and a ferromagnetic pinned layer which are magnetically coupled by a coupling layer such that the magnetization direction of the reference layer is opposite to the magnetization of the pinned layer.

A pinning layer is typically exchange coupled to the pinned layer to fix the magnetization of the pinned layer in a predetermined direction. The pinning layer is typically formed of an antiferromagnetic material. In antiferromagnetic materials, the magnetic moments of adjacent atoms point in opposite directions and, thus, there is no net magnetic moment in the material.

GMR spin valves are configured to operate in either a current-in-plane (CIP) mode or a current-perpendicular-to-plane (CPP) mode. In CIP mode, the sense current is passed through in a direction parallel to the layers of the read sensor. In CPP mode, the sense current is passed through in a direction perpendicular to the layers of the read sensor.

A tunneling magnetoresistive (TMR) read sensor is similar in structure to a GMR spin valve configured in CPP mode, but the physics of the device are different. For a TMR read sensor, rather than using a spacer layer, a barrier layer is positioned between the free layer and the pinned layer (or reference layer of the SAF). Electrons must tunnel through the barrier layer. A sense current flowing perpendicularly to the plane of the layers of the TMR read sensor experiences a resistance which is proportional to the cosine of an angle formed between the magnetization direction of the free layer and the magnetization direction of the pinned layer (or reference layer of the SAF).

One principal concern in the performance of magnetoresistive read sensors is the fluctuation of magnetization in the read sensor, which directly affects the magnetic noise of the read sensor. A key determinant of the fluctuation of magnetization in the read sensor is the lateral size of the pinned layer and the pinning layer. A large pinning layer contains a greater number of structural grains than a small pinning layer. The increased number of structural grains increases the pinning field direction dispersion in the pinning layer, which decreases fluctuations of magnetization in the pinned layer. This not only decreases the magnetic noise of the read sensor, but it also decreases the variation of pinning direction from sensor to sensor and improves the long term stability of the sensor. It is important, however, to ensure that the lateral size of the free layer is not increased. The spatial resolution of the read sensor (the areal density of magnetic data it can support) is determined by the size of the free layer, and therefore a small free layer provides a higher spatial resolution than a large free layer.

The present invention addresses these and other needs, and offers other advantages over current devices.

BRIEF SUMMARY OF THE INVENTION

The present invention is a magnetoresistive stack for use in a magnetic read head. The magnetoresistive stack has a plurality of layers including a ferromagnetic free layer, a ferromagnetic pinned layer, and an antiferromagnetic pinning layer. The pinned layer and pinning layer each have a greater number of structural grains than the free layer, which decreases a fluctuation of magnetization in the magnetoresistive stack without decreasing a spatial resolution of the magnetoresistive stack.

BRIEF DESCRIPTION OF THE DRAWINGS

FIG. 1 is a diagram describing characteristics of a pinned layer and pinning layer of the present invention.

DETAILED DESCRIPTION

FIG. 1 shows the effect of the number of structural grains in an antiferromagnetic pinning layer on pinning field direction dispersion and average magnetization direction. A larger pinning layer with a greater number of structural grains has a significantly greater pinning field direction dispersion than a smaller pinning layer with a fewer number of structural grains. This produces a more uniform and defined direction of magnetization in the pinned layer.

Figure 2A:
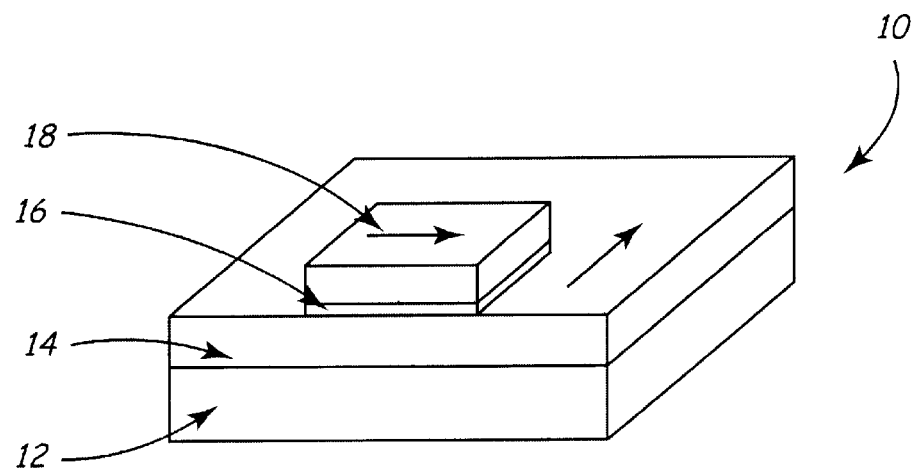
FIG. 2A is a layer diagram of a sensor structure of the present invention.

FIG. 2A is a layer diagram of a sensor structure 10 of the present invention. Sensor structure 10 includes a pinning layer 12, a pinned layer 14, a spacer/barrier layer 16, and a free layer 18. Pinning layer 12 is an antiferromagnetic material. Pinned layer 14 can be a single ferromagnetic layer or a multilayer synthetic antiferromagnet, and is positioned adjacent to pinning layer 12. Free layer 18 is a ferromagnetic material. Spacer/barrier layer 16 is positioned between pinned layer 14 and free layer 18, and is a nonmagnetic conducting material when utilized as a spacer layer in a giant magnetoresistive (GMR) stack, or is a nonmagnetic insulating material when utilized as a barrier layer in a tunneling magnetoresistive (TMR) stack.

The magnetization of pinned layer 14 is fixed while the magnetization of free layer 18 rotates freely in response to an external magnetic field emanating from a magnetic medium. The magnetization of pinned layer 14 is pinned by exchange coupling pinning layer 12 with pinned layer 14. The resistance of sensor structure 10 varies as a function of an angle that is formed between the magnetization of free layer 18 and the magnetization of pinned layer 14.

Pinning layer 12 and pinned layer 14 each have a significantly greater number of structural grains (and thus a significantly greater lateral size) than free layer 18. The lateral size of free layer 18 is typically about 4 square structural grains to about 9 square structural grains. The lateral size of pinning layer 12 and pinned layer 14 is typically about 64 square structural grains to about 100 square structural grains. This allows sensor structure 10 to exhibit a significantly lower fluctuation of magnetization than if pinning layer 12 and pinned layer 14 each had a similar lateral size to free layer 18. In addition, because free layer 18 has a significantly smaller lateral size than pinning layer 12 and pinned layer 14, sensor structure 10 exhibits a significantly higher spatial resolution than if free layer 18 had a similar lateral size to pinning layer 12 and pinned layer 14.

Figure 2B:
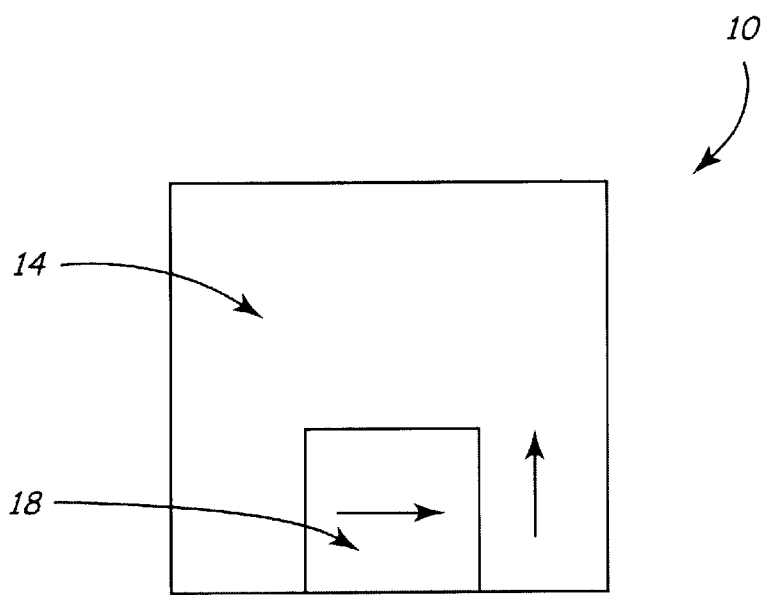
FIG. 2B is an alternative view of a sensor structure of the present invention.

FIG. 2B is an alternative view of sensor structure 10 showing its orientation relative to an air bearing surface (ABS). By elongating pinned layer 14 in a direction parallel to the ABS, sense current shunting through pinned layer 14 is reduced. By elongating pinned layer 14 in a direction perpendicular to the ABS, the shape anisotropy of pinned layer 14 will tend to align the magnetization of pinned layer 14 in the direction perpendicular to the ABS.

Figure 3A:
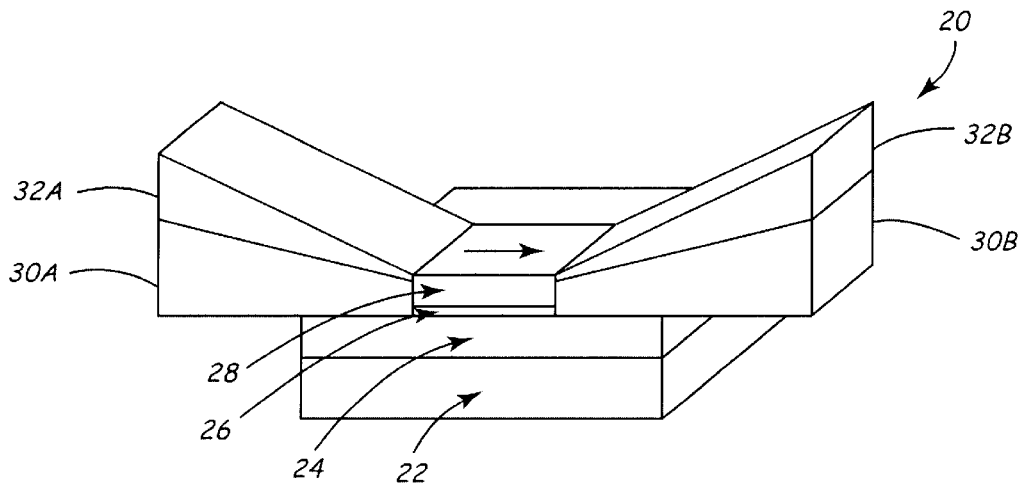
FIG. 3A is a layer diagram of a first embodiment of a magnetoresistive stack of the present invention.

FIG. 3A is a layer diagram of a first embodiment of a giant magnetoresistive (GMR) stack 20 of the present invention. GMR stack 20 has a current-in-plane (CIP) geometry and includes a pinning layer 22, a pinned layer 24, a spacer layer 26, a free layer 28, permanent magnets 30A and 30B, and contacts 32A and 32B. Pinning layer 22 is an antiferromagnetic material. Pinned layer 24 can be a single ferromagnetic material or a multilayer synthetic antiferromagnet, and is positioned adjacent to pinning layer 22. Free layer 28 is a ferromagnetic material. Spacer layer 26 is a nonmagnetic conducting material, and is positioned between pinned layer 24 and free layer 28. Permanent magnets 30A and 30B are each positioned adjacent to pinned layer 24 and to a corresponding side of spacer layer 26 and free layer 28. Contacts 32A and 32B are positioned adjacent to permanent magnets 30A and 30B, respectively, and to a corresponding side of free layer 28.

The magnetization of pinned layer 24 is fixed while the magnetization of free layer 28 rotates freely in response to an external magnetic field emanating from a magnetic medium. The magnetization of pinned layer 24 is pinned by exchange coupling pinning layer 22 with pinned layer 24. Permanent magnets 30A and 30B stabilize free layer 28 and provides proper bias. Contacts 32A and 32B provide a sense current through GMR stack 20. The resistance of GMR stack 20 varies as a function of an angle that is formed between the magnetization of free layer 28 and the magnetization of pinned layer 24. The GMR signal produced by GMR stack 20 is generated by the sense current flowing parallel to the layers of GMR stack 20.

Pinning layer 22 and pinned layer 24 each have a significantly greater number of structural grains (and thus a significantly greater lateral size) than free layer 28. The lateral size of free layer 28 is typically about 4 square structural grains to about 9 square structural grains. The lateral size of pinning layer 22 and pinned layer 24 is typically about 64 square structural grains to about 100 square structural grains. This allows GMR stack 20 to exhibit a significantly lower fluctuation of magnetization than if pinning layer 22 and pinned layer 24 each had a similar lateral size to free layer 28. In addition, because free layer 28 has a significantly smaller lateral size than pinning layer 22 and pinned layer 24, GMR stack 20 exhibits a significantly higher spatial resolution than if free layer 28 had a similar lateral size to pinning layer 22 and pinned layer 24.

GMR stack 20 would also function similarly if permanent magnets 30A and 30B were replaced by antiferromagnetic exchange tabs coupled to the outer regions of free layer 28.

Figure 3B:
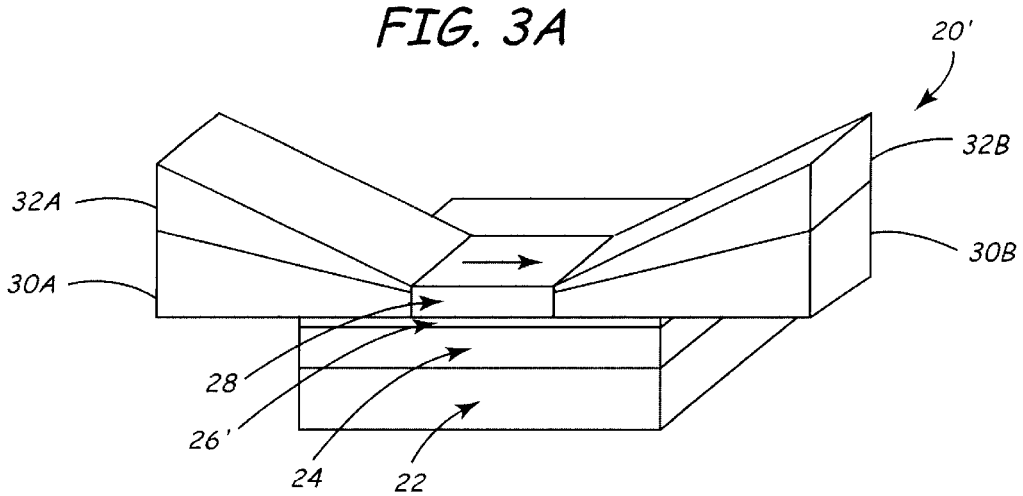
FIG. 3B is a layer diagram of a second embodiment of a magnetoresistive stack of the present invention.

FIG. 3B is a layer diagram of a second embodiment of a GMR stack 20' of the present invention. GMR stack 20' is similar to GMR stack 20 of FIG. 3A. Spacer layer 26', however, differs from spacer layer 26 of GMR stack 20 in that spacer layer 26' has a similar lateral size to pinned layer 24 (instead of free layer 28). Spacer layer 26' is a nonmagnetic conducting material and separates permanent magnets 30A and 30B from pinned layer 24. This prevents direct exchange coupling between permanent magnets 30A and 30B and pinned layer 24, which can disturb spin structure in pinned layer 24.

Figure 3C:
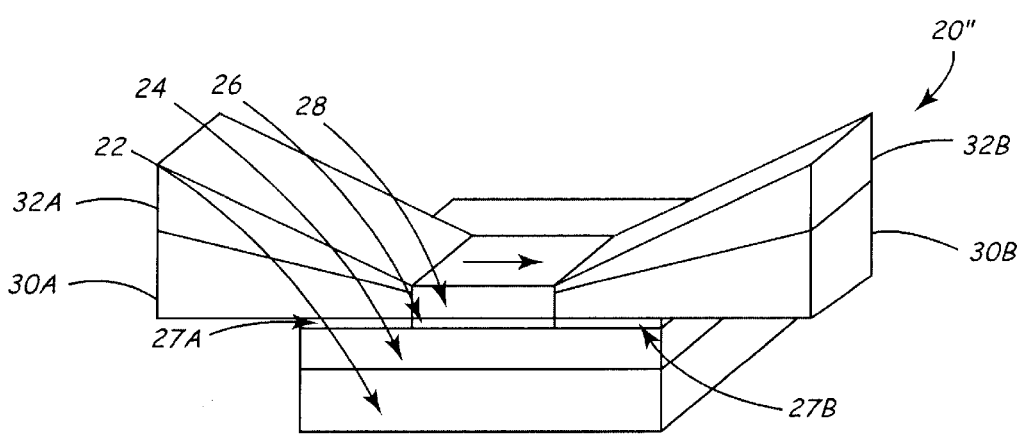
FIG. 3C is a layer diagram of a third embodiment of a magnetoresistive stack of the present invention.

FIG. 3C is a layer diagram of a third embodiment of a magnetoresistive stack 20" of the present invention. GMR stack 20" is similar to GMR stack 20 of FIG. 3A. GMR stack 20", however, differs from GMR stack 20 in that GMR stack 20" includes separator layers 27A and 27B. Separator layer 27A is positioned between permanent magnet 30A and pinned layer 24, and separator layer 27B is positioned between permanent magnet 30B and pinned layer 24. Separator layers 27A and 27B are a nonmagnetic conducting material and prevent direct exchange coupling between permanent magnets 30A and 30B and pinned layer 24, which can disturb spin structure in pinned layer 24.

Figure 4A:
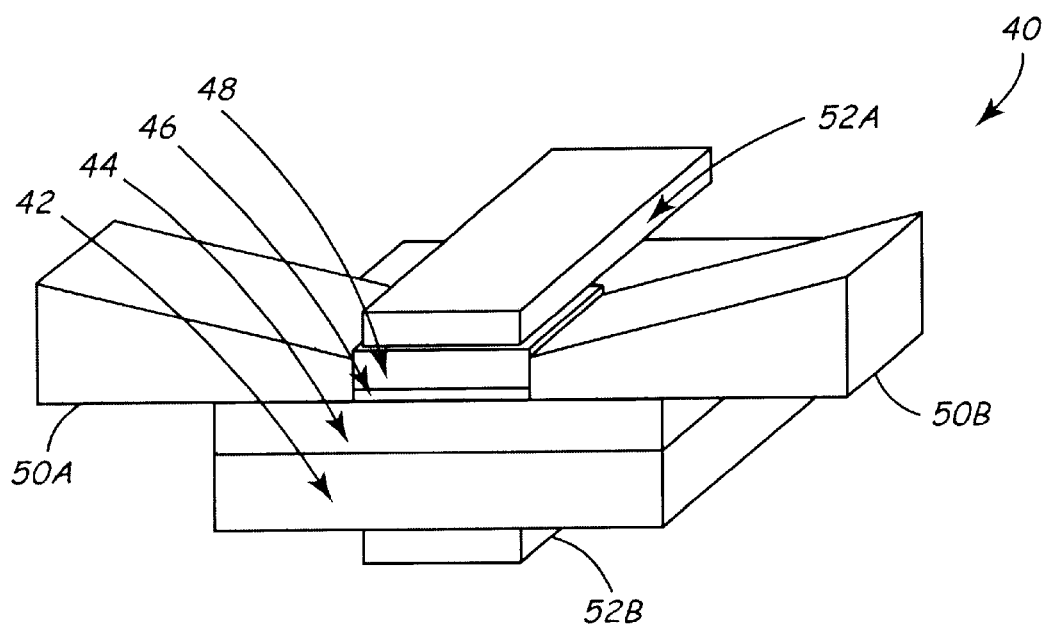
FIG. 4A is a layer diagram of a fourth embodiment of a magnetoresistive stack of the present invention.

FIG. 4A is a layer diagram of a fourth embodiment of a GMR stack 40 of the present invention. Magnetoresistive stack 40 has a current-perpendicular-to-plane (CPP) geometry and includes a pinning layer 42, a pinned layer 44, a spacer layer 46, a free layer 48, permanent magnets 50A and 50B, and contacts 52A and 52B. Pinning layer 42 is an antiferromagnetic material. Pinned layer 44 can be a single ferromagnetic material or a multilayer synthetic antiferromagnet, and is positioned adjacent to pinning layer 42. Free layer 48 is a ferromagnetic material. Spacer layer 46 is a nonmagnetic conducting material, and is positioned between pinned layer 44 and free layer 48. Permanent magnets 50A and 50B are each positioned adjacent to pinned layer 44 and to a corresponding side of spacer layer 46 and free layer 48. Contacts 52A and 52B are positioned adjacent to free layer 48 and pinning layer 42, respectively.

The magnetization of pinned layer 44 is fixed while the magnetization of free layer 48 rotates freely in response to an external magnetic field emanating from a magnetic medium. The magnetization of pinned layer 44 is pinned by exchange coupling pinning layer 42 with pinned layer 44. The resistance of GMR stack 40 varies as a function of an angle that is formed between the magnetization of free layer 48 and the magnetization of pinned layer 44. The GMR signal produced by GMR stack 40 is generated by a sense current flowing perpendicularly through the layers of GMR stack 40.

Pinning layer 42 and pinned layer 44 each have a significantly greater number of structural grains (and thus a significantly greater lateral size) than free layer 48. The lateral size of free layer 48 is typically about 4 square structural grains to about 9 square structural grains. The lateral size of pinning layer 42 and pinned layer 44 is typically about 64 square structural grains to about 100 square structural grains. This allows GMR stack 40 to exhibit a significantly lower fluctuation of magnetization than if pinning layer 42 and pinned layer 44 each had a similar lateral size to free layer 48. In addition, because free layer 48 has a significantly smaller lateral size than pinning layer 42 and pinned layer 44, GMR stack 40 exhibits a significantly higher spatial resolution than if free layer 48 had a similar lateral size to pinning layer 42 and pinned layer 44.

GMR stack 40 would also function similarly if permanent magnets 50A and 50B were replaced by antiferromagnetic exchange tabs coupled to the outer regions of free layer 48.

Figure 4B:
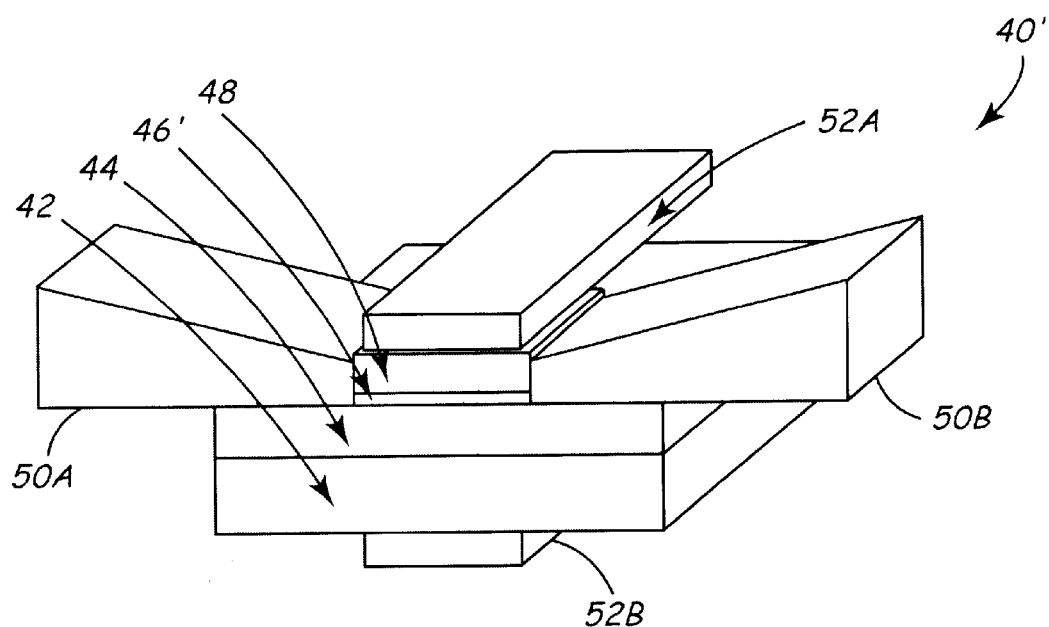
FIG. 4B is a layer diagram of a fifth embodiment of a magnetoresistive stack of the present invention.

FIG. 4B is a layer diagram of a fifth embodiment of a tunneling magnetoresistive (TMR) stack 40' of the present invention. TMR stack 40' is similar to GMR stack 40 of FIG. 4A. Barrier layer 46', however, differs from spacer layer 46 of GMR stack 40 in that barrier layer 46' is a nonmagnetic insulating material (instead of a nonmagnetic conducting material). The TMR signal produced by TMR stack 40' is generated by a sense current flowing perpendicularly through the layers of TMR stack 40'.

For both GMR stack 40 and TMR stack 40', permanent magnets 50A and 50B can be separated from pinned layer 44 using techniques similar to those in FIGS. 3B and 3C.

Although the present invention has been described with reference to preferred embodiments, workers skilled in the art will recognize that changes may be made in form and detail without departing from the spirit and scope of the invention.

What is claimed is:

1. A read sensor for use in a magnetic read head, the read sensor comprising:
 a magnetoresistive stack having a plurality of layers; and
 means for decreasing a fluctuation of magnetization in the read sensor without decreasing a spatial resolution of the read sensor, the means for decreasing a fluctuation of magnetization in the read sensor including a ferromagnetic pinned layer and an antiferromagnetic pinning layer each having a greater lateral size than a ferromagnetic free layer and each having a greater dimension extending perpendicular from an air bearing surface of the read sensor than the ferromagnetic free layer.

2. The read sensor of claim 1 wherein the means for decreasing a fluctuation of magnetization in the read sensor increases a pinning field direction dispersion in an antiferromagnetic pinning layer.

3. The read sensor of claim 1 wherein the means for decreasing a fluctuation of magnetization in the read sensor increases a number of structural grains in an antiferromagnetic pinning layer.

4. The read sensor of claim 1 wherein the pinned layer is a synthetic antiferromagnet.

5. The read sensor of claim 1 wherein the magnetoresistive stack is a giant magnetoresistive (GMR) stack configured to operate in a current-in-plane (CIP) mode wherein a sense current flows substantially parallel to a longitudinal plane of the layers of the stack.

6. The read sensor of claim 1 wherein the magnetoresistive stack is a giant magnetoresistive (GMR) stack configured to operate in a current-perpendicular-to-plane (CPP) mode wherein a sense current flows substantially perpendicular to a longitudinal plane of the layers of the stack.

7. The read sensor of claim 1 wherein the magnetoresistive stack is a tunneling magnetoresistive (TMR) stack configured to operate in a current-perpendicular-to-plane (CPP) mode wherein a sense current flows substantially perpendicular to a longitudinal plane of the layers of the stack.

8. A read sensor for use in a magnetic read head, the read sensor having a plurality of layers including:
 a ferromagnetic free layer having a rotatable magnetic moment;
 a ferromagnetic pinned layer having a fixed magnetic moment; and
 an antiferromagnetic pinning layer positioned adjacent to the pinned layer, wherein the pinned layer and the pinning layer each have a greater lateral size than the free layer and have a greater dimension extending perpendicular from an air bearing surface of the read sensor than the free layer.

9. The read sensor of claim 8 wherein the pinned layer is a synthetic antiferromagnet.

10. The read sensor of claim 8 wherein the read sensor further includes a nonmagnetic spacer layer positioned between the free layer and the pinned layer.

11. The read sensor of claim 10 wherein the read sensor is a giant magnetoresistive (GMR) stack configured to operate in a current-in-plane (CIP) mode wherein a sense current flows substantially parallel to a longitudinal plane of the pinned layer.

12. The read sensor of claim 10 wherein the read sensor is a giant magnetoresistive (GMR) stack configured to operate in a current-perpendicular-to-plane (CPP) mode wherein a sense current flows substantially perpendicular to a longitudinal plane of the pinned layer.

13. The read sensor of claim 8 wherein the read sensor further includes a barrier layer positioned between the free layer and the pinned layer.

14. The read sensor of claim 13 wherein the read sensor is a tunneling magnetoresistive (TMR) stack configured to operate in a current-perpendicular-to-plane (CPP) mode wherein a sense current flows substantially perpendicular to a longitudinal plane of the pinned layer.

\* \* \* \* \*